(12) United States Patent
Kuunyeeh et al.

(10) Patent No.: US 11,253,054 B1
(45) Date of Patent: Feb. 22, 2022

(54) TOOTHPASTE DISPENSING TOOTHBRUSH ASSEMBLY

(71) Applicants: Cornelius Kuunyeeh, Henderson, KY (US); Connie Kuunyeeh, Henderson, KY (US)

(72) Inventors: Cornelius Kuunyeeh, Henderson, KY (US); Connie Kuunyeeh, Henderson, KY (US)

( * ) Notice: Subject to any disclaimer, the term of this patent is extended or adjusted under 35 U.S.C. 154(b) by 0 days.

(21) Appl. No.: 17/109,564

(22) Filed: Dec. 2, 2020

(51) Int. Cl.
| | |
|---|---|
| *A46B 11/00* | (2006.01) |
| *A46B 5/00* | (2006.01) |
| *A46B 9/04* | (2006.01) |
| *A46B 13/00* | (2006.01) |
| *A61C 17/16* | (2006.01) |

(52) U.S. Cl.
CPC ........ *A46B 11/0051* (2013.01); *A46B 5/0095* (2013.01); *A46B 9/04* (2013.01); *A46B 11/001* (2013.01); *A46B 11/002* (2013.01); *A46B 11/0065* (2013.01); *A46B 13/00* (2013.01); *A46B 2200/1066* (2013.01); *A61C 17/16* (2013.01)

(58) Field of Classification Search
CPC ... A46B 11/00; A46B 11/0003; A46B 11/001; A46B 11/002; A46B 11/0065; A46B 11/0062; A46B 11/0072; A46B 13/00; A46B 13/02; A46B 5/0095; A46B 9/04; A46B 2200/1066; A46B 2200/1037; A61C 17/16; A61C 17/00
USPC ............... 401/270, 188 R, 268, 282, 286
See application file for complete search history.

(56) References Cited

U.S. PATENT DOCUMENTS

| | | | |
|---|---|---|---|
| 6,957,925 B1 | 10/2005 | Jacobs | |
| D759,977 S | 6/2016 | Lozoya | |
| 10,021,963 B2 | 7/2018 | Johnson | |
| 10,154,728 B2 | 12/2018 | Hailechristos | |
| 2006/0210352 A1 | 9/2006 | Clark | |
| 2010/0186179 A1* | 7/2010 | Miller | A61C 1/07 15/22.2 |
| 2013/0011177 A1* | 1/2013 | Kuo | A61C 17/227 401/188 R |
| 2017/0007384 A1* | 1/2017 | Wagner | A61C 17/3418 |
| 2018/0110601 A1* | 4/2018 | Mighall | A61C 17/0202 |
| 2019/0116968 A1 | 4/2019 | Curry | |
| 2019/0133309 A1 | 5/2019 | Hobbs | |

FOREIGN PATENT DOCUMENTS

WO WO2017132140 8/2017

* cited by examiner

*Primary Examiner* — David J Walczak

(57) ABSTRACT

A toothpaste dispensing toothbrush assembly for brushing teeth includes a handle that has an open end for accessing an interior of the handle. A cylinder is filled with a toothpaste and the cylinder is insertable into the open end of the handle. A pump is positioned within the handle to pump the toothpaste outwardly from the cylinder when the pump is turned on. A toothbrush head is removably attachable to the handle to brush the user's teeth. The toothbrush head receives the toothpaste from the pump to deposit the toothpaste on the user's teeth. A vibration unit is integrated into the handle and the vibration unit vibrates the toothbrush head when the vibration unit is turned on.

15 Claims, 10 Drawing Sheets

TOOTHPASTE DISPENSING TOOTHBRUSH ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dispensing toothbrush devices and more particularly pertains to a new dispensing toothbrush device for brushing teeth.

(2) Description of Related Art Including Information Disclosed Under 37 CFR 1.97 and 1.98

The prior art relates to dispensing toothbrush devices including a variety of powered toothbrushes that each has a reservoir integrated therein for containing toothpaste.

BRIEF SUMMARY OF THE INVENTION

An embodiment of the disclosure meets the needs presented above by generally comprising a handle that has an open end for accessing an interior of the handle. A cylinder is filled with toothpaste and the cylinder is insertable into the open end of the handle. A pump is positioned within the handle to pump the toothpaste outwardly from the cylinder when the pump is turned on. A toothbrush head is removably attachable to the handle to brush the user's teeth. The toothbrush head receives the toothpaste from the pump to deposit the toothpaste on the user's teeth. A vibration unit is integrated into the handle and the vibration unit vibrates the toothbrush head when the vibration unit is turned on.

There has been thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
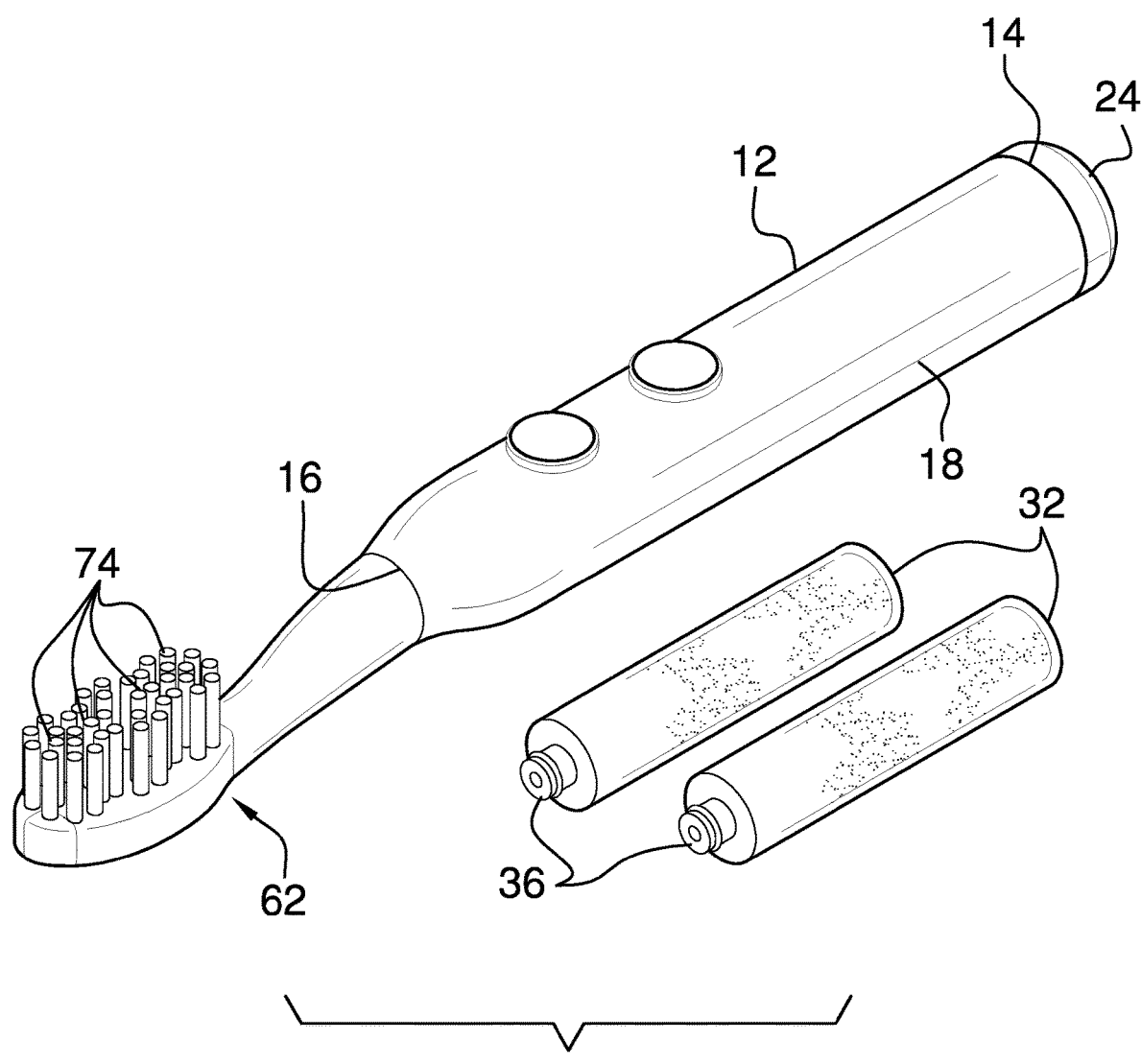
FIG. 1 is a perspective view of a toothpaste dispensing toothbrush assembly according to an embodiment of the disclosure.
Figure 2:
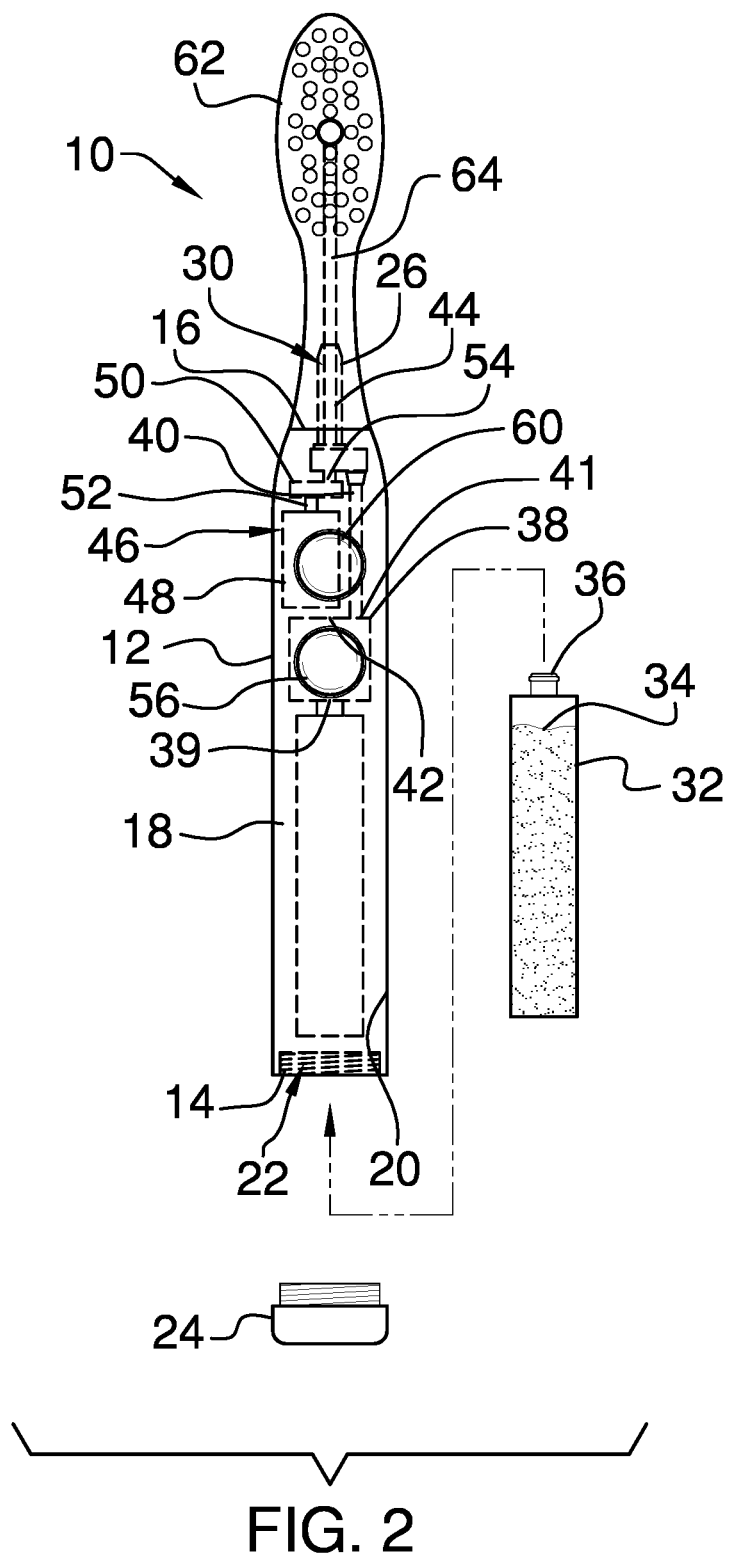
FIG. 2 is an exploded phantom view of an embodiment of the disclosure.
Figure 3:
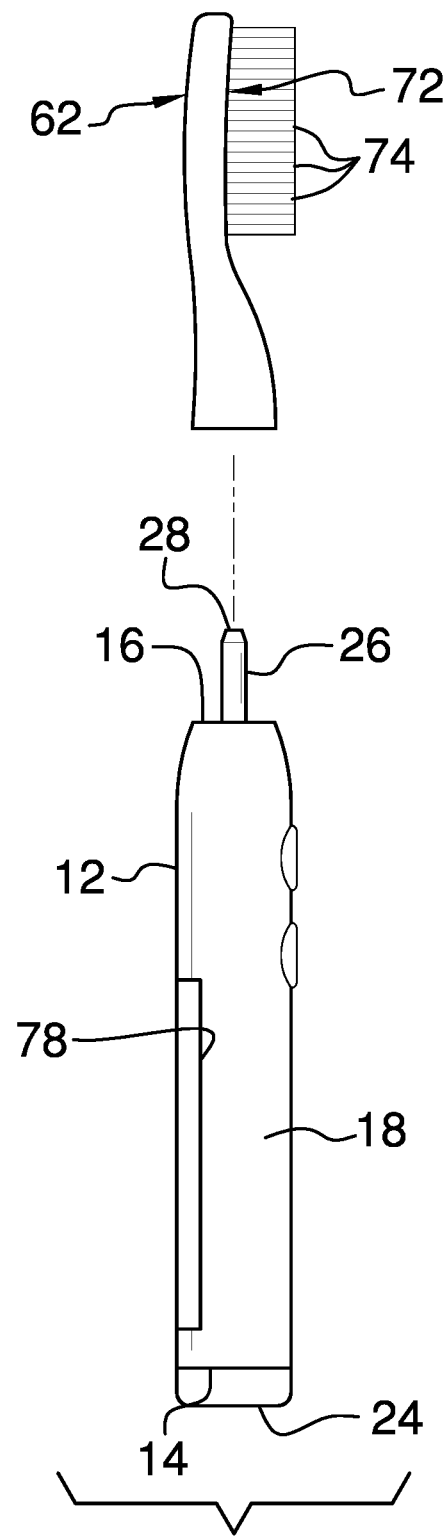
FIG. 3 is an exploded view of an embodiment of the disclosure.
Figure 4:
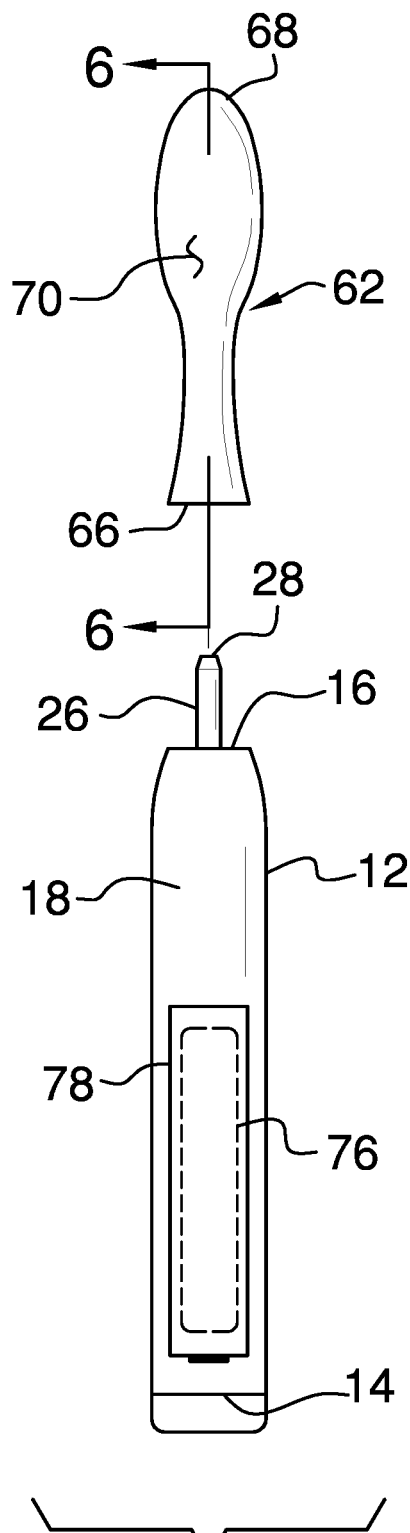
FIG. 4 is a top exploded view of an embodiment of the disclosure.
Figure 5:
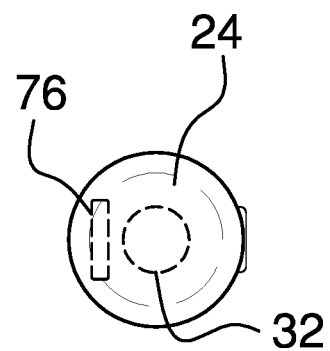
FIG. 5 is a bottom phantom view of an embodiment of the disclosure.
Figure 6:
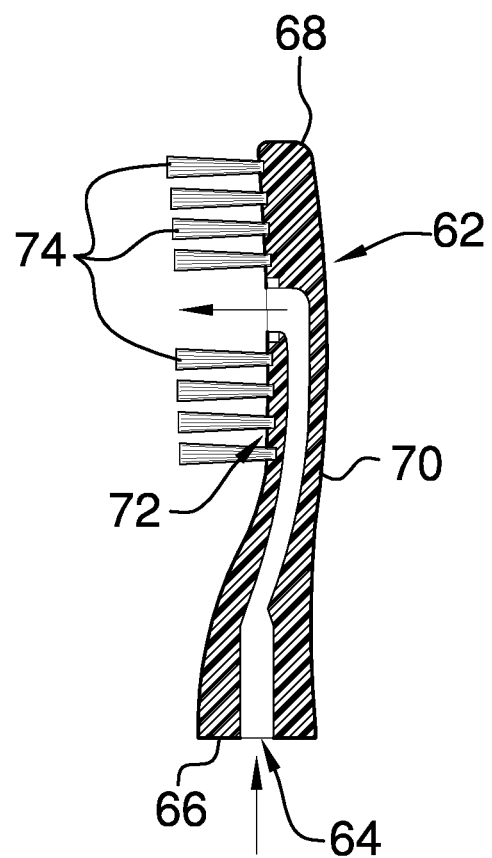
FIG. 6 is a cross sectional view taken along line 6-6 of FIG. 4 of an embodiment of the disclosure.
Figure 7:
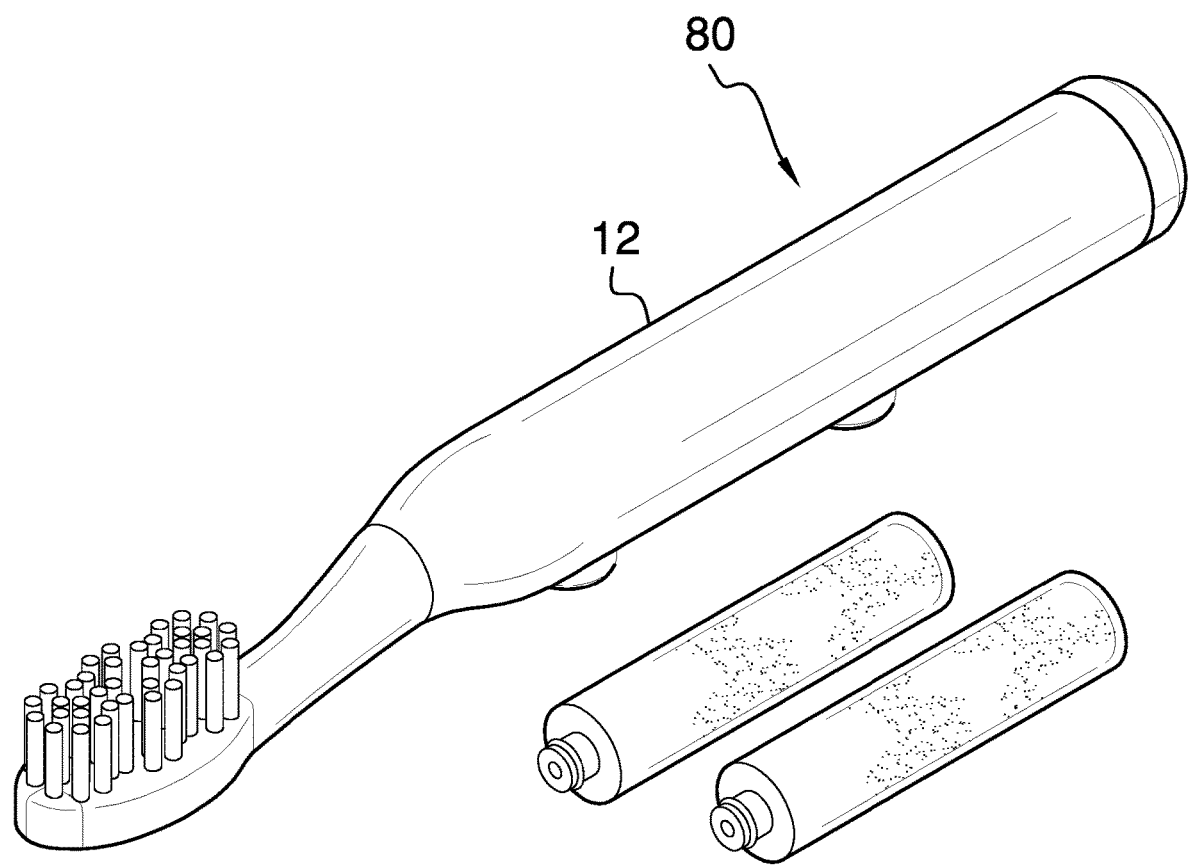
FIG. 7 is a perspective view of an alternative embodiment of the disclosure.
Figure 8:
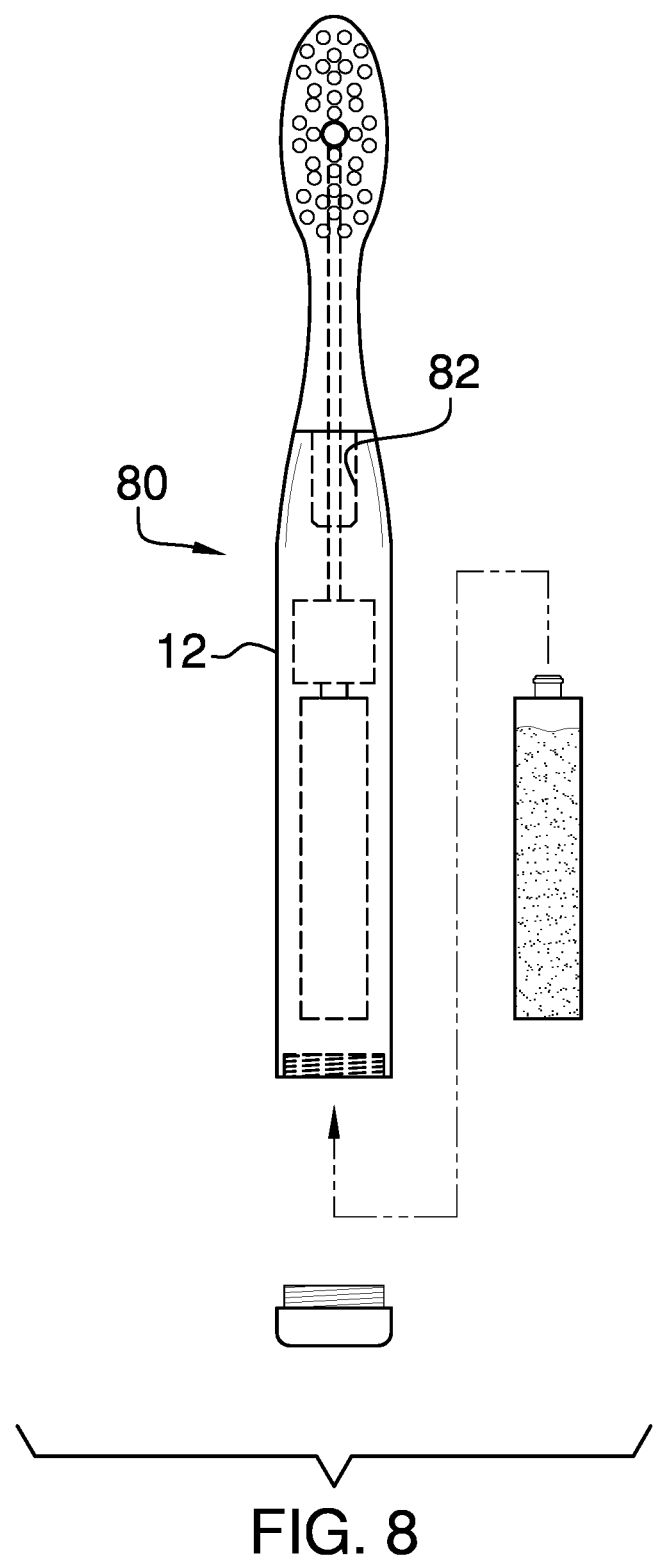
FIG. 8 is an exploded phantom view of an alternative embodiment of the disclosure.
Figure 9:
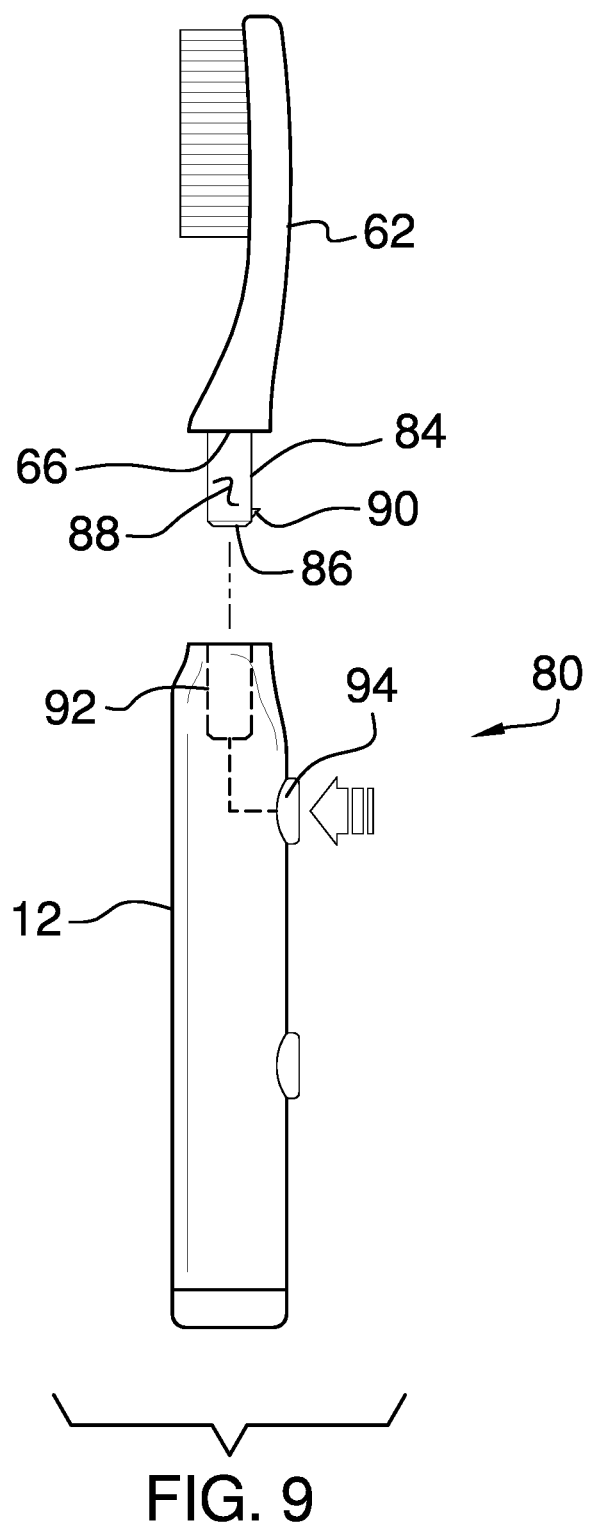
FIG. 9 is a right side exploded view of an alternative embodiment of the disclosure.
Figure 10:
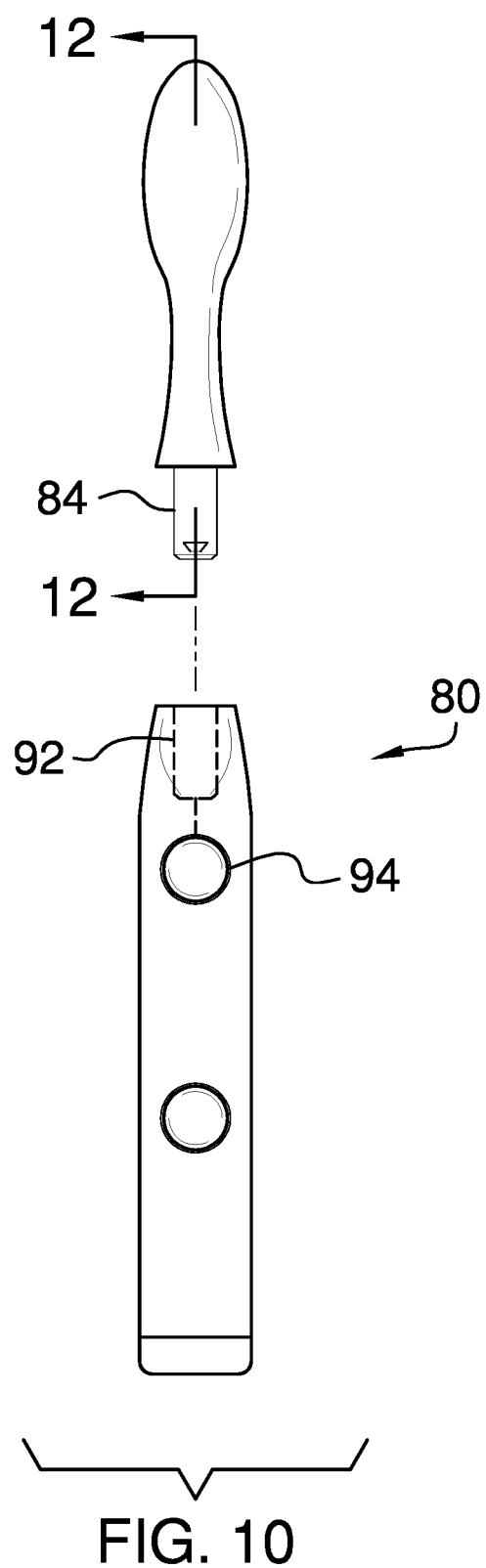
FIG. 10 is a top exploded view of an alternative embodiment of the disclosure.
Figure 11:
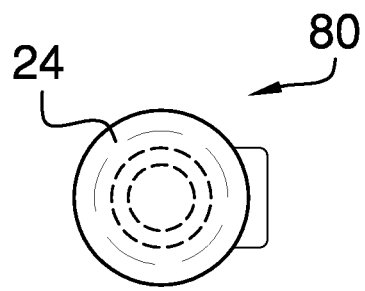
FIG. 11 is a bottom phantom view of an alternative embodiment of the disclosure.
Figure 12:
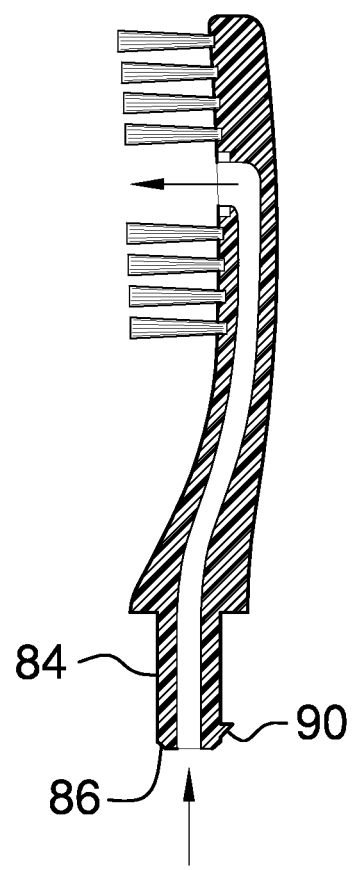
FIG. 12 is a cross sectional view taken along line 12-12 of FIG. 10 of an alternative embodiment of the disclosure.
Figure 13:
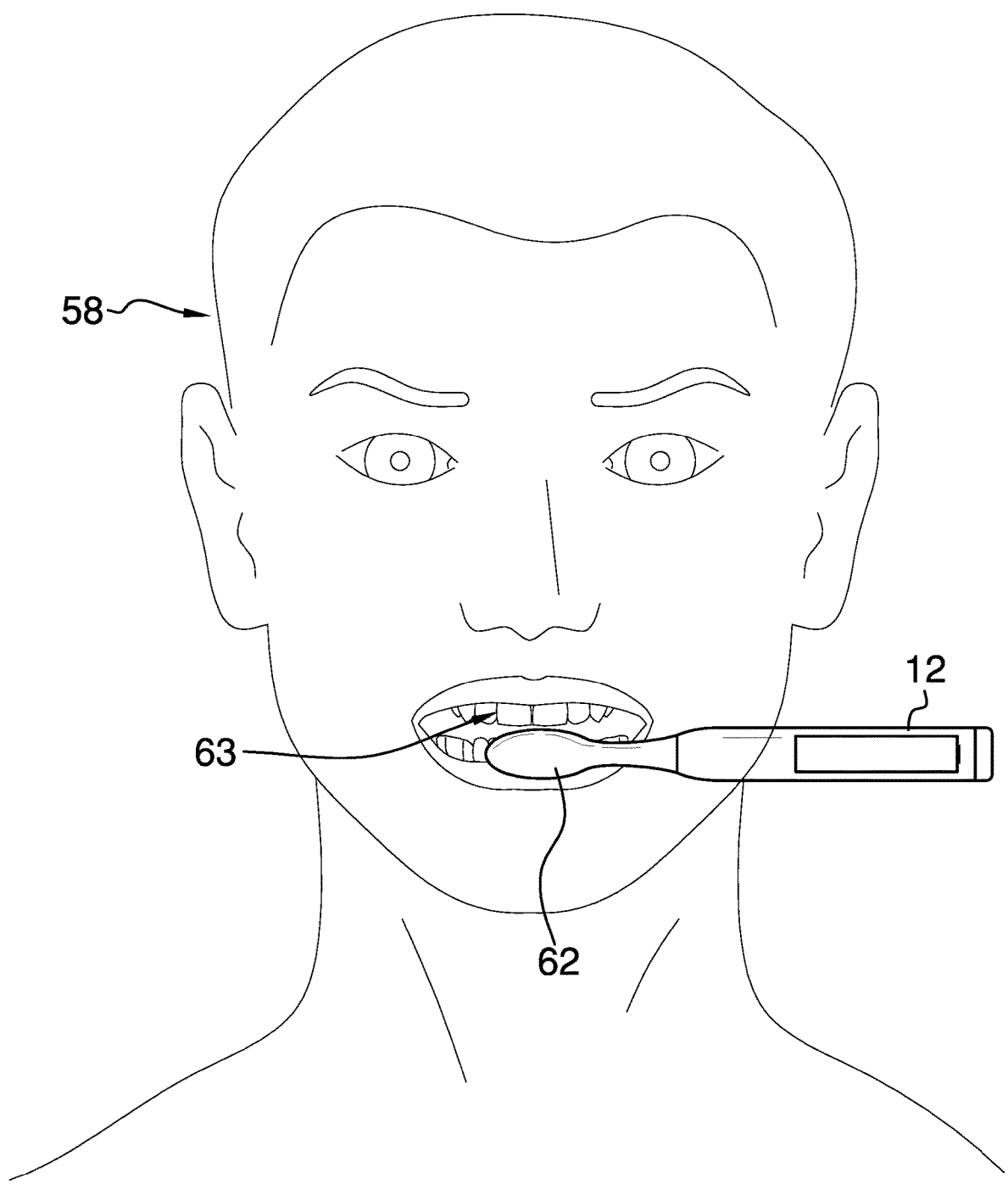
FIG. 13 is a perspective in-use view of an embodiment of the disclosure.

With reference now to the drawings, and in particular to FIGS. 1 through 13 thereof, a new dispensing toothbrush device embodying the principles and concepts of an embodiment of the disclosure and generally designated by the reference numeral 10 will be described.

As best illustrated in FIGS. 1 through 13, the toothpaste dispensing toothbrush assembly 10 generally comprises a handle 12 that is hollow, and the handle 12 has an open end 14 for accessing an interior of the handle 12. The handle 12 has a distal end 16 with respect to the open end 14 and an outer wall 18 extending therebetween, and the handle 12 is elongated between the open end 14 and the distal end 16. Moreover, the outer wall 18 is continuously arcuate about an axis extending through the open end 14 and the distal end 16 such that the handle 12 has a cylindrical shape. The handle 12 has an interior surface 20 and the interior surface 20 has a threaded portion 22 adjacent to the open end 14. A cap 24 is provided that threadably engages the threaded portion 22 for closing the open end 14 of the handle 12.

A nipple 26 is coupled to and extends away from the handle 12 and the nipple 26 has a distal end 28 with respect to the distal end 16 of the handle 12. The nipple 26 has a channel 30 extending between the distal end 16 of the handle 12 and the distal end 28 of the nipple 26. A cylinder 32 is provided that is filled with a toothpaste 34 and the cylinder 32 is insertable into the open end 14 of the handle 12. Additionally, the cylinder 32 has an outlet 36 that is in fluid communication with an interior of the cylinder 32 thereby facilitating the toothpaste 34 to flow outwardly through the outlet 36.

A pump 38 is positioned within the handle 12 and the cylinder 32 fluidly engages the pump 38 when the cylinder 32 is inserted into the handle 12. The pump 38 pumps the toothpaste 34 outwardly from the cylinder 32 when the pump 38 is turned on. The pump 38 has an inlet 39 and an output 41, and the inlet 39 is fluidly coupled to the outlet 36 on the cylinder 32 when the cylinder 32 is inserted into the handle 12. Additionally, the pump 38 pumps the toothpaste 34 outwardly through the output 41 when the pump 38 is turned on. The pump 38 may comprise an electric fluid pump or the like.

A conduit 40 is positioned within the handle 12 and the conduit 40 is fluidly coupled to the pump 38 such that the conduit 40 receives the toothpaste 34 when the pump 38 is turned on. The conduit 40 extends outwardly from the handle 12, and the conduit 40 has a first end 42 and a second end 44. The first end 42 is fluidly coupled to the output 41 of the pump 38. The second end 44 is in fluid communication with the nipple 26 such that the toothpaste 34 is urged outwardly through the distal end 28 of the nipple 26 when the pump 38 is turned on.

A vibration unit 46 is integrated into the handle 12 and the vibration unit 46 is in mechanical communication with the nipple 26. The vibration unit 46 vibrates the nipple 26 when the vibration unit 46 is turned on. The vibration unit 46 comprises a motor 48 that is positioned within the handle 12 and the motor 48 rotates in a first direction when the motor 48 is turned on. The motor 48 may comprise an electric motor or the like.

The vibration unit 46 includes a vibration box 50 that is positioned within the handle 12. The vibration box 50 has an input shaft 52 and the input shaft 52 is in mechanical communication with the motor 48 such that the motor 48 rotates the input shaft 52 when the motor 48 is turned on. The vibration box 50 has an output shaft 54 that is in mechanical communication with the nipple 26. The output 42 rotates about an axis that is offset with a rotational axis of the input shaft 52 such that vibration is imparted into the output shaft 54 when the input shaft 52 rotates. In this way the output shaft 54 can vibrate the nipple 26 when the motor 48 is turned on. The vibration unit may include an eccentric cam that is positioned therein which is rotated when motor 48 is turned on.

A pump button 56 is movably integrated into the handle 12 such that the pump button 56 can be depressed by a user 58. The pump button 56 is in electrical communication with the pump 38 and the pump button 56 turns the pump 38 on when the pump button 56 is depressed. The pump button 56 turns the pump 38 off when the pump button 56 is released. A vibrate button 60 is movably integrated into the handle 12 and the vibrate button 60 can be depressed by the user 58. The vibrate button 60 is in electrical communication with the vibration unit 46 and the vibration unit 46 is turned on when the vibrate button 60 is initially depressed. The vibration unit 46 is turned off when the vibrate button 60 is subsequently depressed. The vibrate button 60 is electrically coupled to the motor 48, the motor 48 rotates in the first direction when the vibrate button 60 is initially depressed and the motor 48 is turned off when the vibrate button 60 is subsequently depressed.

A toothbrush head 62 is removably attachable to the nipple 26 on the handle 12 to brush the user's teeth 63. The toothbrush head 62 has a conduit 64 integrated therein such that the conduit 64 in the toothbrush head 62 receives the toothpaste 34 from the nipple 26. In this way the toothbrush head 62 deposits the toothpaste 34 on the user's teeth 63. The toothbrush head 62 has a first end 66, a second end 68 and an outer surface 70 extending therebetween, and the outer surface 70 has a flattened portion 72 that is positioned adjacent to the second end 68 of the toothbrush head 62. The conduit 40 extends through the first end 66 of the toothbrush head 62 and outwardly through the flattened portion 72. Moreover, the conduit 64 in the toothbrush head 62 insertably receives the distal end 28 of the nipple 26 such that the first end 66 of the toothbrush head 62 rests against the distal end 16 of the handle 12. In this way the nipple 26 vibrates the toothbrush head 62 when the vibration unit 46 is turned on to enhance brushing the user's teeth 63.

A plurality of bristles 74 is each coupled to the toothbrush head 62 to frictionally engage the user's teeth 63 for brushing the user's teeth 63. Each of the bristles 74 is positioned on and extends away from the flattened portion 72 of the outer surface of the toothbrush head 62. Additionally, the bristles 74 are spaced apart from each other and are distributed on the flattened portion 72. A power supply 76 is removably positioned in the handle 12, the power supply 76 is electrically coupled to each of the pump button 56 and the vibrate button 60, and the power supply 76 comprises at least one battery. A battery cover 78 is removably coupled to the outer wall 18 of the handle 12 and the power supply 76 is positioned beneath the battery cover 78.

In an alternative embodiment 80 as is most clearly shown in FIGS. 7 through 12, the distal end 16 of the handle 12 has a well 82 extending toward the open end 14 of the handle 12. The first end 66 of the toothbrush head 62 has a plug 84 coupled thereto that extends along an axis extending between the first end 66 and the second end 68 of the toothbrush head 62. The plug 84 has a distal end 86 with respect to the first end 66 of the toothbrush head 62 and an outer surface 88. The outer surface 88 has a tab 90 extending outwardly therefrom and the tab 90 is positioned adjacent to the distal end 86 of the plug 84. Moreover, the well 82 in the distal end 16 of the handle 12 insertably receives the plug 84.

Continuing in the alternative embodiment 80, an engagement 92 is integrated into the handle 12. The engagement 92 is biased to engage the tab 90 on the plug 84 for retaining the plug 84 in the well 82. Additionally, the engagement 92 includes a release button 94 that is movably integrated into the handle 12. The engagement 92 disengages the tab 90 when the release button 94 is depressed for removing the toothbrush head 62 from the handle 12.

In use, the cylinder 32 is inserted into the handle 12 and the cap 24 is coupled to the handle 12 to retain the cylinder 32 in the handle 12. The toothbrush head 62 is attached to the handle 12 and the pump button 56 is depressed to dispense a desired amount of the toothpaste 34 onto the toothbrush head 62. In this way the user 58 can brush their teeth 63 with the toothbrush head 62. Additionally, the vibrate button 60 can be depressed to vibrate the toothbrush head 62 to enhance brushing the user's teeth 63. The cylinder 32 is replaced when the toothpaste 34 in the cylinder 32 is depleted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A toothpaste dispensing toothbrush assembly for storing and dispensing toothpaste from a disposable cylinder, said assembly comprising:
   a handle being hollow, said handle having an open end for accessing an interior of said handle;
   a nipple being coupled to and extending away from said handle;
   a cylinder being filled with a toothpaste, said cylinder being insertable into said open end of said handle;
   a pump being positioned within said handle, said cylinder fluidly engaging said pump when said cylinder is inserted into said handle, said pump pumping said toothpaste outwardly from said cylinder when said pump is turned on;
   a conduit being positioned within said handle, said conduit being fluidly coupled to said pump such that said conduit receives said toothpaste when said pump is turned on, said conduit extending outwardly from said handle;
   a vibration unit being integrated into said handle, said vibration unit being in mechanical communication with said nipple, said vibration unit vibrating said nipple when said vibration unit is turned on;
   a pump button being movably integrated into said handle wherein said pump button is configured to be depressed by a user, said pump button being in electrical communication with said pump, said pump button turning said pump on when said pump button is depressed, said pump button turning said pump off when said pump button is released;
   a vibrate button being movably integrated into said handle wherein said vibrate button is configured to be depressed by the user, said vibrate button being in electrical communication with said vibration unit, said vibration unit being turned on when said vibration button is initially depressed, said vibration unit being turned off when said vibration button is subsequently depressed;
   a toothbrush head being removably attachable to said nipple on said handle wherein said toothbrush head is configured to brush the user's teeth, said toothbrush head having a conduit being integrated therein such that said conduit receives said toothpaste from said nipple wherein said toothbrush head is configured to deposit the toothpaste on the user's teeth;
   a plurality of bristles, each of said bristles being coupled to said toothbrush head wherein each of said bristles is configured to frictionally engage the user's teeth for brushing the user's teeth.

2. The assembly according to claim 1, wherein said handle has a distal end with respect to said open end and an outer wall extending therebetween, said handle being elongated between said open end and said distal end, said outer wall being continuously arcuate about an axis extending through said open end and said distal end such that said handle has a cylindrical shape, said handle having an interior surface, said interior surface having a threaded portion adjacent to said open end.

3. The assembly according to claim 2, wherein said nipple has a distal end with respect to said distal end of said handle, said nipple having a channel extending between said distal end of said handle and said distal end of said nipple.

4. The assembly according to claim 3, wherein said toothbrush head has a first end, a second end and an outer surface extending therebetween, said outer surface having a flattened portion being positioned adjacent to said second end of said toothbrush head, said conduit in said toothbrush head extending through said first end of said toothbrush head and outwardly through said flattened portion, said conduit in said toothbrush head insertably receiving said distal end of said nipple such that said first end of said toothbrush head rests against said distal end of said handle thereby facilitating said nipple to vibrate said toothbrush head when said vibration unit is turned on wherein said vibration unit is configured to enhance brushing the user's teeth.

5. The assembly according to claim 4, wherein each of said bristles is positioned on and extends away from said flattened portion of said outer surface of said toothbrush head, said plurality of bristles being spaced apart from each other and being distributed on said flattened portion.

6. The assembly according to claim 1, wherein said cylinder has an outlet being in fluid communication with an interior of said cylinder thereby facilitating said toothpaste to flow outwardly through said outlet.

7. The assembly according to claim 6, wherein said pump has an inlet and an output, said inlet being fluidly coupled to said outlet on said cylinder when said cylinder is inserted into said handle, said pump pumping said toothpaste outwardly through said output when said pump is turned on.

8. The assembly according to claim 7, wherein said conduit has a first end and a second end, said first end being fluidly coupled to said output of said pump, said second end being in fluid communication with said nipple such that said toothpaste is urged outwardly through a distal end of said nipple when said pump is turned on.

9. The assembly according to claim 1, wherein said vibration unit comprises a motor being positioned within said handle, said motor rotating in a first direction when said motor is turned on.

10. The assembly according to claim 9, wherein said vibration unit includes a vibration box being positioned within said handle, said vibration box having an input shaft, said input shaft being in mechanical communication with said motor such that said motor rotates said input shaft when said motor is turned on, said vibration box having an output shaft being in mechanical communication with said nipple, said output shaft rotating about an axis being offset with a rotational axis of said input shaft such that vibration is imparted into said output shaft when said input shaft rotates thereby facilitating said output shaft to vibrate said nipple when said motor is turned on.

11. The assembly according to claim 1, further comprising a power supply being removably positioned in said handle, said power supply being electrically coupled to each of said pump button and said vibrate button, said power supply comprising at least one battery.

12. A toothpaste dispensing toothbrush assembly for storing and dispensing toothpaste from a disposable cylinder, said assembly comprising:

a handle being hollow, said handle having an open end for accessing an interior of said handle, said handle having a distal end with respect to said open end and an outer wall extending therebetween, said handle being elongated between said open end and said distal end, said outer wall being continuously arcuate about an axis extending through said open end and said distal end such that said handle has a cylindrical shape, said handle having an interior surface, said interior surface having a threaded portion adjacent to said open end;

a nipple being coupled to and extending away from said handle, said nipple having a distal end with respect to said distal end of said handle, said nipple having a channel extending between said distal end of said handle and said distal end of said nipple;

a cylinder being filled with a toothpaste, said cylinder being insertable into said open end of said handle, said cylinder having an outlet being in fluid communication with an interior of said cylinder thereby facilitating said toothpaste to flow outwardly through said outlet;

a pump being positioned within said handle, said cylinder fluidly engaging said pump when said cylinder is inserted into said handle, said pump pumping said toothpaste outwardly from said cylinder when said pump is turned on, said pump having an inlet and an output, said inlet being fluidly coupled to said outlet on said cylinder when said cylinder is inserted into said handle, said pump pumping said toothpaste outwardly through said output when said pump is turned on;

a conduit being positioned within said handle, said conduit being fluidly coupled to said pump such that said conduit receives said toothpaste when said pump is turned on, said conduit extending outwardly from said handle, said conduit having a first end and a second end, said first end being fluidly coupled to said output of said pump, said second end being in fluid communication with said nipple such that said toothpaste is urged outwardly through said distal end of said nipple when said pump is turned on;

a vibration unit being integrated into said handle, said vibration unit being in mechanical communication with said nipple, said vibration unit vibrating said nipple when said vibration unit is turned on, said vibration unit comprising:

a motor being positioned within said handle, said motor rotating in a first direction when said motor is turned on; and a vibration box being positioned within said handle, said vibration box having an input shaft, said input shaft being in mechanical communication with said motor such that said motor rotates said input shaft when said motor is turned on, said vibration box having an output shaft being in mechanical communication with said nipple, said output shaft rotating about an axis being offset with a rotational axis of said input shaft such that vibration is imparted into said output shaft when said input shaft rotates thereby facilitating said output shaft to vibrate said nipple when said motor is turned on;

a pump button being movably integrated into said handle wherein said pump button is configured to be depressed by a user, said pump button being in electrical communication with said pump, said pump button turning said pump on when said pump button is depressed, said pump button turning said pump off when said pump button is released;

a vibrate button being movably integrated into said handle wherein said vibrate button is configured to be depressed by the user, said vibrate button being in electrical communication with said vibration unit, said vibration unit being turned on when said vibration button is initially depressed, said vibration unit being turned off when said vibration button is subsequently depressed, said vibration button being electrically coupled to said motor, said motor rotating in said first direction when said vibrate button is initially depressed, said motor being turned off when said vibrate button is subsequently depressed;

a toothbrush head being removably attachable to said nipple on said handle wherein said toothbrush head is configured to brush the user's teeth, said toothbrush head having a conduit being integrated therein such that said conduit in said toothbrush head receives said toothpaste from said nipple wherein said toothbrush head is configured to deposit the toothpaste on the user's teeth, said toothbrush head having a first end, a second end and an outer surface extending therebetween, said outer surface having a flattened portion being positioned adjacent to said second end of said toothbrush head, said conduit in said toothbrush head extending through said first end of said toothbrush head and outwardly through said flattened portion, said conduit in said toothbrush head insertably receiving said distal end of said nipple such that said first end of said toothbrush head rests against said distal end of said handle thereby facilitating said nipple to vibrate said toothbrush head when said vibration unit is turned on wherein said vibration unit is configured to enhance brushing the user's teeth;

a plurality of bristles, each of said bristles being coupled to said toothbrush head wherein each of said bristles is configured to frictionally engage the user's teeth for brushing the user's teeth, each of said bristles being positioned on and extending away from said flattened portion of said outer surface of said toothbrush head, said plurality of bristles being spaced apart from each other and being distributed on said flattened portion; and a power supply being removably positioned in said handle, said power supply being electrically coupled to each of said pump button and said vibrate button, said power supply comprising at least one battery.

13. The assembly according to claim 12, wherein said distal end of said handle has a well extending toward said open end of said handle.

14. The assembly according to claim 13, wherein said first end of said toothbrush head has a plug being coupled thereto and extending along an axis extending between said first end and said second end of said toothbrush head, said plug having a distal end with respect to said first end of said toothbrush head and an outer surface, said outer surface having a tab extending outwardly therefrom, said tab being positioned adjacent to said distal end of said plug, said well in said distal end of said handle insertably receiving said plug.

15. The assembly according to claim 14, further comprising an engagement being integrated into said handle, said engagement being biased to engage said tab on said plug for retaining said plug in said well, said engagement including a release button being movably integrated into said handle, said engagement disengaging said tab when said release button is depressed for removing said toothbrush head from said handle.

\* \* \* \* \*